(12) United States Patent
Yamakawa (10) Patent No.: US 6,178,030 B1
(45) Date of Patent: Jan. 23, 2001

(54) LIGHT-SCANNING OPTICAL SYSTEM HAVING WOBBLE-CORRECTING FUNCTION AND LIGHT-SCANNING APPARATUS USING THE SAME

(75) Inventor: Hiromitsu Yamakawa, Omiya (JP)

(73) Assignee: Fuji Photo Optical Co., Ltd.

( * ) Notice: Under 35 U.S.C. 154(b), the term of this patent shall be extended for 0 days.

(21) Appl. No.: 09/547,990

(22) Filed: Apr. 12, 2000

Related U.S. Application Data (63) Continuation-in-part of application No. 09/498,994, filed on Feb. 7, 2000.

(30) Foreign Application Priority Data

Feb. 12, 1999 (JP) .................................................. 11-033821

(51) Int. Cl.$^7$ .................................................. G02B 26/08
(52) U.S. Cl. .......................... 359/207; 359/205; 359/206; 359/216
(58) Field of Search .................................. 359/205–207, 359/216–219, 662, 710, 716, 784; 347/256–261

(56) References Cited

U.S. PATENT DOCUMENTS

| | | | |
|---|---|---|---|
| 5,343,325 | * | 8/1994 | Yamakawa .............................. 359/205 |
| 5,418,639 | * | 5/1995 | Yamazaki .............................. 359/205 |
| 5,517,215 | * | 5/1996 | Harris et al. .......................... 347/257 |
| 5,526,166 | * | 6/1996 | Genovese ............................. 359/204 |
| 5,808,773 | * | 9/1998 | Ono ..................................... 359/205 |

OTHER PUBLICATIONS

Japanese Patent Office, Patent Abstracts of Japan, Publication No. 04141619 A, Date of Publication: May 15, 1992, Application No. 02263751, Date of Filing: Oct. 3, 1990.
Japanese Patent Office, Patent Abstracts of Japan, Publication No. 05215986 A, Date of Publication: Aug. 27, 1993, Application No. 04019937, Date of Filing: Feb. 5, 1992.

* cited by examiner

Primary Examiner—Darren Schuberg
Assistant Examiner—Fayez Assaf
(74) Attorney, Agent, or Firm—Snider & Associates; Ronald R. Snider (57) ABSTRACT

In a light-scanning optical system comprising a laser light source 11, a collimating lens 12, a first imaging optical system 1, a second imaging optical system 2, and a surface 19 to be scanned, the second imaging optical system 2 comprises, successively from the light-deflecting/reflecting surface side, a toric first lens 16 in which both sections in the main-scanning direction and in the sub-scanning direction have a positive power, a second lens 17 in which both surfaces are aspheric, and a third lens 18 having a positive power only in the cross section in the sub-scanning direction. As a consequence, the absolute value of imaging magnification of the second imaging optical system 2 between the light-deflecting/reflecting surface 15 and the surface 19 to be scanned in the cross section in the sub-scanning direction becomes 1 to 2, whereby the light-scanning optical system has a wobble-correcting function which is also applicable to apparatus having a relatively long scanning length.

20 Claims, 4 Drawing Sheets

FIG.3A
EXAMPLE 1

— SUB-SCANNING DIRECTION
---- MAIN SCANNING DIRECTION

CURVATURE OF FIELD (mm)

FIG.3B
EXAMPLE 1

DISTORTION (%)

FIG.4A
EXAMPLE 2

— SUB-SCANNING DIRECTION
---- MAIN SCANNING DIRECTION

CURVATURE OF FIELD (mm)

FIG.4B
EXAMPLE 2

DISTORTION (%)

FIG. 5A
EXAMPLE 3

CURVATURE OF FIELD (mm)
—— SUB-SCANNING DIRECTION
---- MAIN SCANNING DIRECTION

FIG. 5B
EXAMPLE 3

DISTORTION (%)

LIGHT-SCANNING OPTICAL SYSTEM HAVING WOBBLE-CORRECTING FUNCTION AND LIGHT-SCANNING APPARATUS USING THE SAME

RELATED APPLICATIONS

This application is a continuation-in-part of U.S. patent application Ser. No. 09/498,994 filed on Feb. 7, 2000. This application also claims the priority of Japanese Patent Application No. 11-033821 filed on Feb. 12, 1999.

BACKGROUND OF THE INVENTION

1. Field of the Invention

The present invention relates to a light-scanning optical system, having a wobble-correcting function, for scanning a laser beam converged on a surface of a photosensitive material, so as to form an image; and a light-scanning apparatus using the same. In particular, the present invention relates to a light-scanning optical system having a wobble-correcting function applicable to a system with a long scanning length exceeding the shorter side of an A3-size (Japanese Industrial Standard) sheet, and a light-scanning apparatus using the same.

2. Description of the Prior Art

There have conventionally been known various kinds of laser-scanning optical systems for scanning a laser beam converged on a surface of a photosensitive material, so as to form an image, and laser printer apparatus and laser print-making apparatus using these optical systems.

Among them, known as a light-scanning optical system having a so-called wobble-correcting function are those disclosed in commonly-assigned Japanese Unexamined Patent Publication Nos. 4-141619 and 5-215986. Here, the light-scanning optical system having a wobble-correcting function comprises a first imaging optical system for linearly forming an image of a luminous flux from a light source onto a light-deflecting/reflecting surface of light-deflecting means or in the vicinity thereof, and a second imaging optical system for forming an image of the luminous flux deflected by the light-deflecting means onto a surface to be scanned, wherein the light-deflecting/reflecting surface and the surface to be scanned are substantially optically conjugate with each other with respect to a cross section in a sub-scanning direction.

In each of the light-scanning optical systems disclosed in the above-mentioned publications, the second imaging optical system is composed of two lens elements, whereby the amount of curvature of field is made smaller, and compactness is realized in the apparatus.

However, these light-scanning optical systems having a wobble-correcting function and light-scanning apparatus using the same are only applicable to systems with a relatively short scanning length, such as one corresponding to the shorter side of an A4-size Japanese Industrial Standard) sheet (210 mm).

Also, even when a scanning length on such an order is sufficient, they cannot be employed in a system requiring a higher resolution.

In the above-mentioned light-scanning optical systems and light-scanning apparatus using the same, the absolute value of imaging magnification between the light-deflecting/ reflecting surface and the surface to be scanned in the cross section in the sub-scanning direction is as high as about 5. Therefore, when they are employed in a system having a longer scanning length or higher resolution, the curvature of field in the sub-scanning direction (sagittal) component becomes so large that it may be difficult to form uniform spots on the surface to be scanned. Also, since the asymmetry in curvature of field generated due to light obliquely incident on the light-deflecting/reflecting surface is further enhanced in the surface to be scanned, the uniformity of light spots would deteriorate.

Further, since the deviation in the vicinity of the light-deflecting/reflecting surface is enhanced, the positional precision of the light-deflecting means must be kept at a high degree.

The above-mentioned magnification can be lowered if the second imaging optical system can be positioned farther from the light-deflecting/reflecting surface between the light-deflecting/reflecting surface and the surface to be scanned. In this case, however, if a scanning length greater than the shorter side of an A4-size Japanese Industrial Standard) sheet is contemplated, then each lens of the second imaging optical system becomes so large that the making of lenses with a required precision may be quite difficult, thus increasing the cost.

SUMMARY OF THE INVENTION

In view of such circumstances, it is an object of the present invention to provide, by lowering the curvature of field in the sub-scanning direction and making the asymmetry in curvature of field in the light-deflecting/reflecting surface less influential while taking account of the easiness and cost of making lenses, a light-scanning optical system, having a wobble-correcting function, which is also applicable to systems having a scanning length exceeding the shorter side of an A3-size (Japanese Industrial Standard) sheet (297 mm).

It is another object of the present invention to provide a light-scanning apparatus using such a light-scanning optical system.

The light-scanning optical system in accordance with the present invention is a light-scanning optical system having a wobble-correcting function and comprising a first imaging optical system for linearly forming an image of a luminous flux from a light source onto a light-deflecting/reflecting surface of light-deflecting means or in the vicinity thereof, and a second imaging optical system for forming an image of the luminous flux deflected by the light-deflecting means onto a surface to be scanned, wherein the light-deflecting/ reflecting surface and the surface to be scanned are substantially optically conjugate with each other with respect to a cross section in a sub-scanning direction;

the second imaging optical system comprising, successively from the light-deflecting means side, a first lens in which each surface has a cross-sectional form in a main scanning direction and a cross-sectional form in the sub-scanning direction different from each other, the cross section of the surface on the second lens side in the main scanning direction and sub-scanning direction having a positive power, a second lens in which each surface has a non-arc cross-sectional form in the main scanning direction, and a third lens having substantially no power in a cross section in the main scanning direction and a positive power in a cross section in the sub-scanning direction.

Preferably, the cross-sectional form in the main scanning direction of the surface of the first lens on the light-deflecting means side is non-arc, each surface of the second lens is an aspheric surface having rotational symmetry, and the third lens is a cylindrical lens in which the cross-sectional form in the main scanning direction of each surface is a line approximately orthogonal to an optical axis.

The first lens may be a toric lens.

The third lens may be a concave cylindrical mirror.

Preferably, each of the first to third lenses is made of plastics.

Preferably, the light-scanning optical system satisfies the following conditional expression:

$$1.0 < f_{3V}/f_V < 1.6$$

where $f_V$ is the focal length of the second imaging optical system in the cross section in the sub-scanning direction; and $f_{3V}$ is the focal length of the third lens in the sub-scanning direction.

The light-scanning apparatus in accordance with the present invention uses the light-scanning optical system having a wobble-correcting function in accordance with the present invention.

The above-mentioned "main scanning direction" refers to a direction parallel to the locus of the deflected light beam on the surface to be scanned, whereas the above-mentioned "sub-scanning direction" refers to a direction substantially orthogonal to the main scanning direction on the surface to be scanned. The above-mentioned "cross section in the main scanning direction" refers to the cross section in the main scanning direction including the optical axis; whereas the above-mentioned "cross section in the sub-scanning direction" refers to the cross section, including the optical axis, perpendicular to the cross section in the main scanning direction.

The above-mentioned "non-arc" refers to the form of a line which is not arc in a predetermined cross section, whereas the above-mentioned "aspheric surface" refers to the form of a surface having rotational symmetry which is formed when the above-mentioned non-arc is rotated about the optical axis.

DESCRIPTION OF THE PREFERRED EMBODIMENTS

In the following, embodiments of the present invention will be explained with reference to the accompanying drawings.

Figure 1:
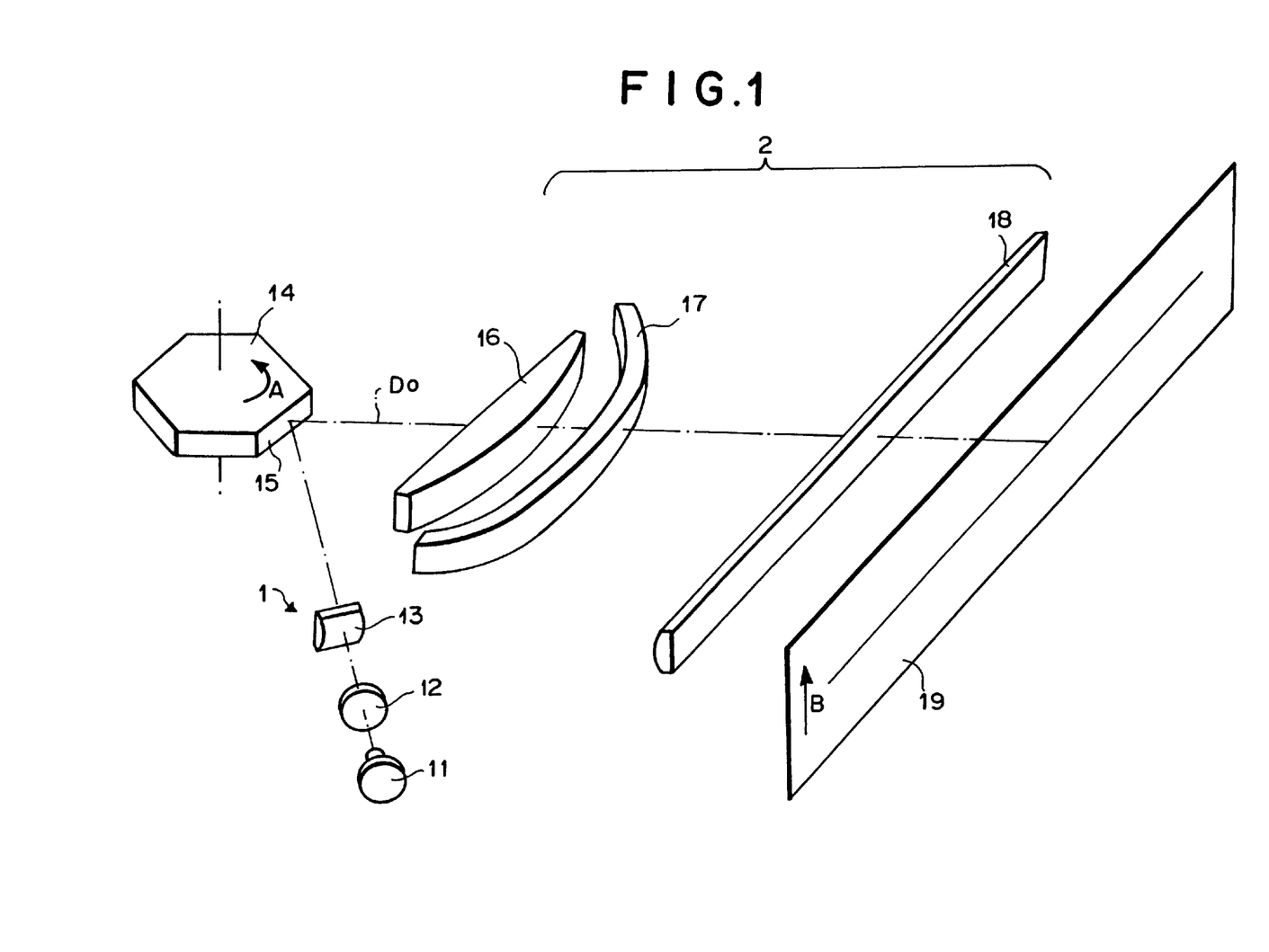
FIG. 1 is a view showing the configuration of the light-scanning optical system in accordance with an embodiment of the present invention.

FIG. 1 is a schematic view showing the configuration of the light-scanning optical system in accordance with an embodiment of the present invention.

As shown in FIG. 1, this light-scanning optical system comprises a collimating lens 12 which causes a light beam emitted from a laser light source 11 to become substantially parallel light; a first imaging optical system 1 for linearly forming an image of the parallel light in the main scanning direction; a polygon mirror 14, having a light-deflecting/reflecting surface 15 in the vicinity of the image-forming position of the first imaging optical system 1, for reflecting/deflecting the light beam onto a surface 19 to be scanned therewith; and a second imaging optical system 2 acting so as to form an image of the light beam reflected/deflected by the polygon mirror 14 onto the surface 19 to be scanned and scan the light beam at a constant speed on the surface 19 to be scanned.

Here, the first imaging optical system 1 is constituted by a cylindrical lens 13 having a positive refracting power in the sub-scanning direction for linearly forming an image of the light beam.

Figure 2A:
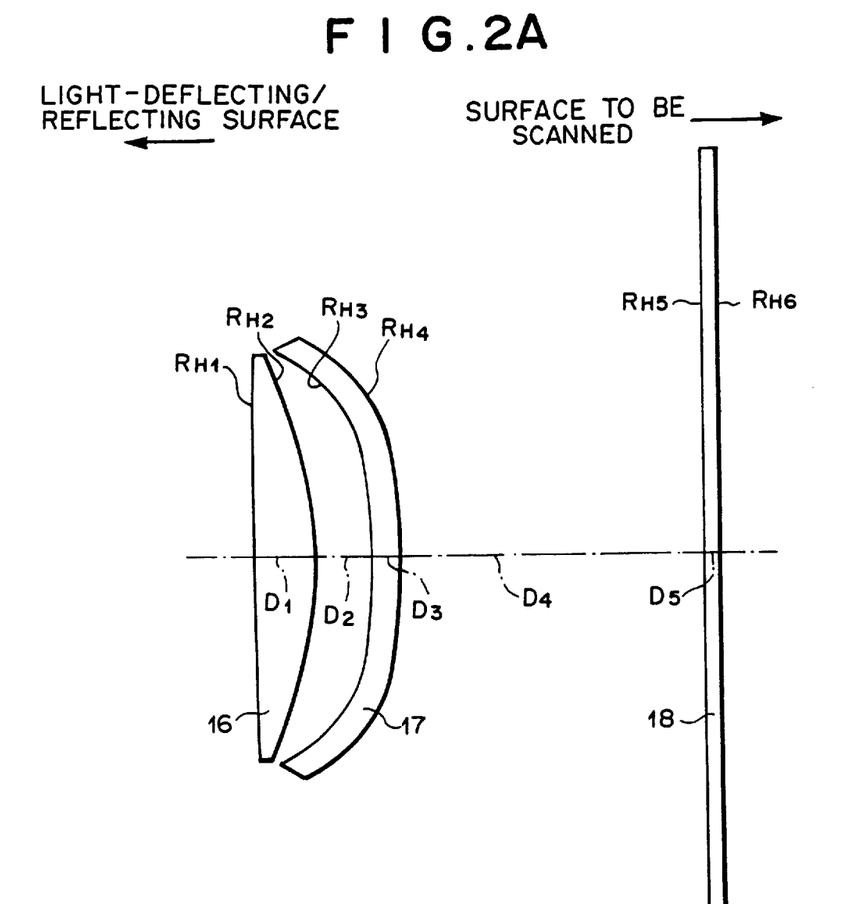
FIGS. 2A and 2B are sectional views in the main scanning direction and the sub-scanning direction, respectively, showing the configuration of the second imaging optical system of the light-scanning optical system in accordance with the above-mentioned embodiment of the present invention.

The second imaging optical system will now be explained with reference to FIGS. 2A and 2B. FIG. 2A is a schematic view of the second imaging optical system of the light-scanning optical system in accordance with the above-mentioned embodiment of the present invention in a cross section in the main scanning direction including the optical axis, whereas FIG. 2B is a schematic view thereof in a cross section, including the optical axis, perpendicular to the cross section in the main scanning direction (hereinafter referred to as "cross section in the sub-scanning direction").

Figure 2B:
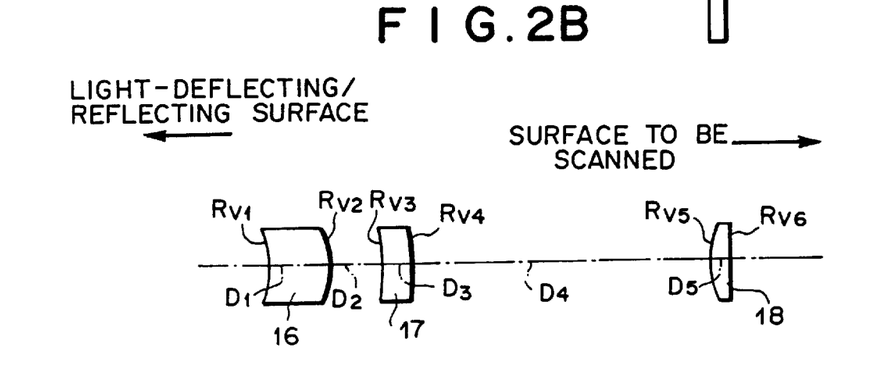

As shown in FIGS. 2A and 2B, the second imaging optical system 2 comprises, successively from the light-deflecting/reflecting surface side, a first lens 16 which is a toric lens whose surface on the light-deflecting means side has a non-arc cross-sectional form in the main scanning direction, while the cross-sectional form in the main scanning direction and the cross-sectional form in the sub-scanning direction in each surface differs from each other, the surface on the second lens side having a positive power in both of the cross section in the main scanning direction and the cross section in the sub-scanning direction; a second lens 17 in which each surface is made of an aspheric surface having rotational symmetry; and a third lens 18 which is a cylindrical lens in which the cross-sectional form in the main scanning direction is a line approximately orthogonal to the optical axis, each surface having substantially no power in the cross section in the main scanning direction and a positive power in the cross section in the sub-scanning direction.

Here, each of the first to third lenses 16 to 18 is made of plastics, and the second imaging system 2 satisfies the following conditional expression:

$$1.0 < f_{3V}/f_V < 1.6$$

where $f_V$ is the focal length of the second imaging optical system 2 in the cross section in the sub-scanning direction; and $f_{3V}$ is the focal length of the third lens 18 in the cross section in the sub-scanning direction.

In FIG. 1, the light beam emitted from the laser light source 11 passes through the second imaging optical system 2, so as to form an image on the surface 19 to be scanned, while being scanned on the surface 19 at substantially a constant speed in the main direction as the polygon mirror 14 rotates in the direction of arrow A. Further, the surface 19 to be scanned is moved in the sub-scanning direction (direction of arrow B), and the light is modulated, so as to form an image. The light-deflecting/reflecting surface 15 and the surface to be scanned 19 are conjugate with each other with respect to the second imaging optical system 2 in the cross section in the sub-scanning direction, whereby a correcting function can optically be obtained concerning the wobbling of the light-deflecting/reflecting surface 15.

Here, the sub-scanning direction is the direction of relative movement between the surface to be scanned 19 and the scanning light beam. Therefore, the scanning light beam may be moved while the surface to be scanned 19 is made stationary.

Since the second imaging optical system 2 has a three-element configuration as mentioned above, the third lens 18 can also share the power of each lens in the cross section in the sub-scanning direction. Since the third lens 18 is located closer to the surface 19 to be scanned than are the other two lenses, the absolute value of imaging magnification β between the light-deflecting/reflecting surface 15 and the surface 19 to be scanned with respect to the cross section in the sub-scanning direction in the second imaging optical system 2 can be made as small as 1 to 2 if the third lens 18 shares the power in the cross section in the sub-scanning direction.

As a consequence, the curvature of field in the sub-scanning direction (sagittal) component can be made smaller, and the asymmetry of the field curvature in the light-deflecting/reflecting surface 15 becomes harder to enhance, whereby uniform light spots can be formed on the surface to be scanned for light-scanning apparatus with a longer scanning length exceeding the shorter side of an A3-size Japanese Industrial Standard) sheet (297 mm) as well.

The present invention is also applicable to light-scanning apparatus requiring a higher resolution.

Further, since the deviation in the vicinity of the light-deflecting/reflecting surface becomes harder to increase, the tolerance for the positional precision of the light-deflecting means can be enhanced.

The number of parts increases when the second imaging optical system 2 has a three-element configuration as such. However, since it is not necessary for the first lens 16 and the second lens 17 to have large dimensions, the easiness in lens manufacture can be maintained, and the increase in cost can be suppressed. Also, since the third lens 18 is a cylindrical lens having a positive power only in the cross section in the sub-scanning direction, it is excellent in the easiness of lens manufacture and in terms of cost. Further, light-weight, inexpensive lenses can be obtained when the three lenses are made of plastics.

The above-mentioned conditional expression concerning $f_{3V}/f_V$ defines the ratio of focal length between the second imaging optical system 2 and the third lens 18 in the cross section in the sub-scanning direction. As mentioned above, the absolute value of imaging magnification β between the light-deflecting/reflecting surface 15 and the surface 19 to be scanned in the sub-scanning direction in the second imaging optical system 2 can be made as small as 1 to 2 if the third lens 18 shares the power in the cross section in the sub-scanning direction. Therefore, it is preferred that a predetermined condition be set for the power distribution ratio to the third lens 18. If the lower limit of the conditional expression is not satisfied, then the position of the third lens 18 will be so close to the surface 19 to be scanned that it may be harder for the second imaging optical system 2 to be disposed within the light-scanning optical system, and the third lens 18 may be elongated in the main scanning direction. If the upper limit of the conditional expression is exceeded, then the above-mentioned absolute value of imaging magnification β may become too large.

EXAMPLES

In the following, examples of the light-scanning optical system having a wobble-correcting function and the light-scanning apparatus using the same in accordance with the present invention, their characteristic second imaging optical system 2 in particular, will be explained in detail with reference to specific numerical values.

Example 1

The light-scanning optical system having a wobble-correcting function in accordance with Example 1 has the configuration mentioned in the above-mentioned embodiment, whereas the collimating lens 12 and the cylindrical lens 13 have focal lengths of 17 mm and 59 mm, respectively.

The upper part of Table 1(following) shows the radii of curvature $R_H$, $R_V$ of each lens surface (in which $R_H$ is the radius of curvature in the cross section in the main scanning direction, $R_V$ is the radius of curvature in the cross section in the sub-scanning direction, each being expressed in terms of mm, as in the subsequent Examples), each lens space (or lens thickness) D (mm), and refractive index N of each lens at a wavelength of 780 nm in the second imaging optical system 2 in Example 1. In Table 1 and its subsequent Tables which will be mentioned later, the numbers referring to letters R, D, and N successively increase from the light-deflecting/reflecting surface side. Also, as will be mentioned later, the radii of curvature $R_H$ and $R_V$ are values of radii of curvature near the optical axis when the lens surface is a surface having a non-arc cross-sectional form in the main scanning direction or an aspheric surface.

Each lens surface will now be explained.

In each lens surface, the non-arc form in the surface having a non-arc form in a predetermined cross section or the aspheric surface form is represented by the following non-arc/aspheric surface expression. This non-arc/aspheric surface expression also applies to the non-arc forms and aspheric forms in examples which will follow.

Non-arc/aspheric expression:

$$Z = \frac{\frac{Y^2}{R}}{1+\sqrt{1-(1+K)\times\frac{Y^2}{R^2}}} + A_4Y^4 + A_6Y^6 + A_8Y^8 + A_{10}Y^{10}$$

where
Z is the length of the perpendicular to the tangential plane (the plane perpendicular to the optical axis) of an apex of the non-arc/aspheric surface from a point on the non-arc/aspheric surface at a distance Y from the optical axis;
Y is the distance from the optical axis;
K is the eccentricity;
R is the radius of curvature of the non-arc/aspheric surface in the vicinity of the optical axis; and
$A_4$, $A_6$, $A_8$, and $A_{10}$ are non-arc/aspheric surface coefficients.

The middle part of the above-mentioned Table 1 indicates the respective values of coefficients 1/R, K, $A_4$, $A_6$, $A_8$, and $A_{10}$ of each non-arc/aspherical surface shown in the above-mentioned non-arc/aspheric surface coefficients in Example 1.

The first surface, i.e., the surface of the first lens 16 on the light-deflecting/reflecting surface side, has a form obtained when a non-arc on the cross section in the main scanning direction represented by the above-mentioned non-arc/aspheric surface expression and individual coefficients is rotated about a line including a point distanced from the intersection between the non-arc and the optical axis by a radius of curvature $R_{V1}$ on the optical axis and being perpendicular to the optical axis within this cross section.

The second surface, i.e., the surface of the first lens 16 facing the surface to be scanned, has a form obtained when an arc having a radius of curvature of $R_{V2}$ is rotated about a line including a point distanced from the intersection between the arc and the optical axis by a radius of curvature $R_2$ on the optical axis and being perpendicular to the cross section in the main scanning direction.

Both surfaces of the second lens 17, i.e., the third and fourth surfaces, have an aspheric surface form having rotational symmetry about the optical axis, represented by the above-mentioned non-arc/aspheric surface expression and individual coefficients.

The third lens 18 is made of a cylindrical lens having a power only in the cross section in the sub-scanning direction, in which the surface (fifth surface) facing the light-deflecting/reflecting surface is a cylindrical surface having a positive power only in the sub-scanning direction, whereas the surface (sixth surface) facing the surface to be scanned is a plane.

The lower part of the above-mentioned Table 1 shows the respective values of distance $D_o$ (mm) from the light-deflecting/reflecting surface 15 to the surface of the first lens 16 on the light-deflecting/reflecting surface side in Example 1, focal length f (mm) of the second imaging optical system 2, half angle of view θ of the light-scanning optical system in accordance with Example 1, wavelength λ (nm) of the laser light source 11, magnification $β_V$ in the cross section in the sub-scanning direction between the light-deflecting/reflecting surface 15 and the surface 19 to be scanned, and $f_{3V}/f_V$ in the conditional expression.

Example 2

The light-scanning optical system having a wobble-correcting function in accordance with Example 2 has a configuration substantially the same as that of Example 1, though the cylindrical lens 13 has a focal length of 33 mm.

The first to sixth lens surfaces in the second imaging optical system 2 in Example 2 have forms similar to those in Example 1, respectively.

The upper part of Table 2(following) shows the radii of curvature $R_H$, $R_V$ of each lens surface, each lens space (or lens thickness) D (mm), and refractive index N of each lens at a wavelength of 780 nm in the second imaging optical system 2 in Example 2. Here, the radii of curvature $R_H$ and $R_V$ are values of radii of curvature near the optical axis when the lens surface is a surface having a non-arc cross-sectional form in the main scanning direction or an aspheric surface.

The middle part of the above-mentioned Table 2 indicates the respective values of coefficients 1/R, K, $A_4$, $A_6$, $A_8$, and $A_{10}$ of each non-arc/aspherical surface shown in the above-mentioned non-arc/aspheric surface coefficients in Example 2; whereas the lower part of Table 2 shows the respective values of distance $D_o$ (mm) from the light-deflecting/reflecting surface 15 to the surface of the first lens 16 on the light-deflecting/reflecting surface side in Example 2, focal length f (mm) of the second imaging optical system 2, half angle of view θ of the light-scanning optical system in accordance with Example 2, wavelength λ (nm) of the laser light source 11, magnification $β_V$ in the cross section in the sub-scanning direction between the light-deflecting/reflecting surface 15 and the surface 19 to be scanned, and $f_{3V}/f_V$ in the conditional expression.

Example 3

The light-scanning optical system having a wobble-correcting function in accordance with Example 3 has a configuration substantially the same as that of Example 1.

The first to sixth lens surfaces in the second imaging optical system 2 in Example 3 have forms similar to those in Example 1, respectively.

The upper part of Table 3(following) shows the radii of curvature $R_H$, $R_V$ of each lens surface, each lens space (or lens thickness) D (mm), and refractive index N of each lens at a wavelength of 780 nm in the second imaging optical system 2 in Example 3. Here, the radii of curvature $R_H$ and $R_V$ are values of radii of curvature near the optical axis when the lens surface is a surface having a non-arc cross-sectional form in the main scanning direction or an aspheric surface.

The middle part of the above-mentioned Table 3 indicates the respective values of coefficients 1/R, K, $A_4$, $A_6$, $A_8$, and $A_{10}$ of each non-arc/aspherical surface shown in the above-mentioned non-arc/aspheric surface coefficients in Example 3; whereas the lower part of Table 3 shows the respective values of distance $D_o$ (mm) from the light-deflecting/reflecting surface 15 to the surface of the first lens 16 on the light-deflecting/reflecting surface side in Example 3, focal length f (mm) of the second imaging optical system 2, half angle of view θ of the light-scanning optical system in accordance with Example 3, wavelength λ (nm) of the laser light source 11, magnification $β_V$ in the cross section in the sub-scanning direction between the light-deflecting/reflecting surface 15 and the surface 19 to be scanned, and $f_{3V}/f_V$ in the conditional expression.

Figures 3A, 3B:
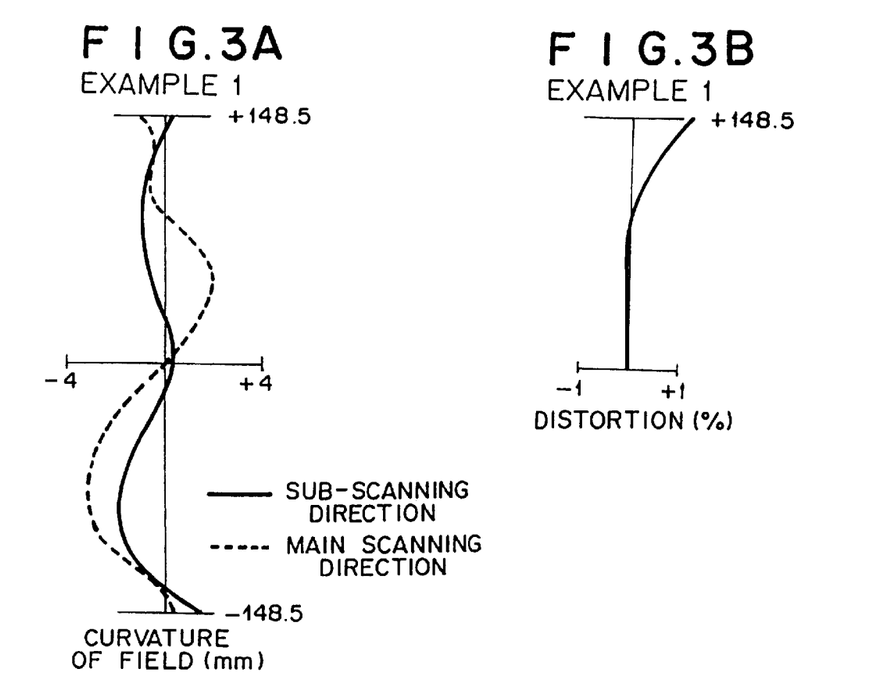
FIGS. 3A and 3B are aberration charts of the light-scanning optical system in accordance with Example 1.
Figures 4A, 4B:
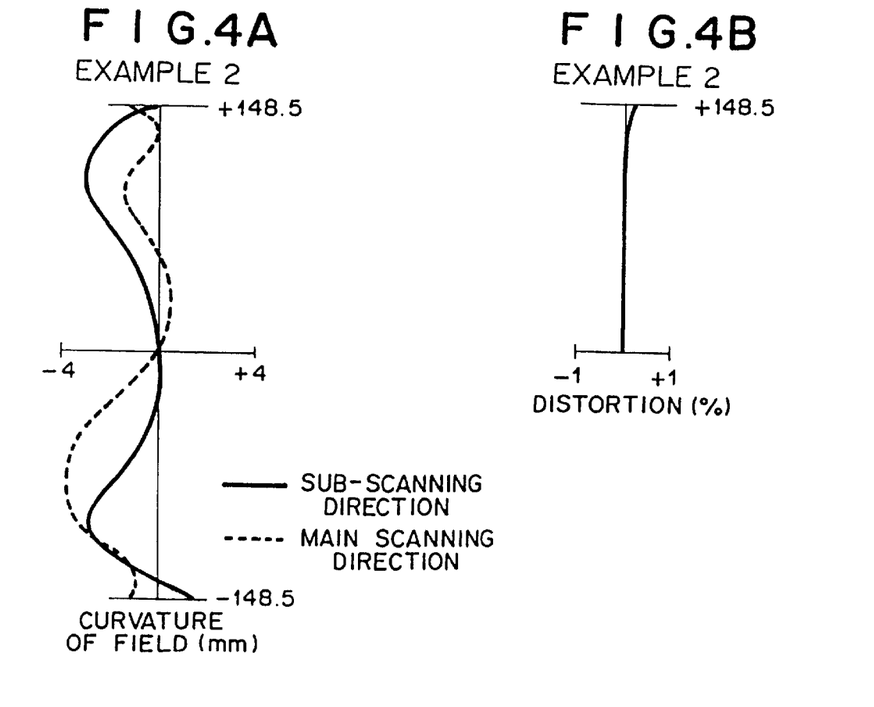
FIGS. 4A and 4B are aberration charts of the light-scanning optical system in accordance with Example 2.
Figures 5A, 5B:
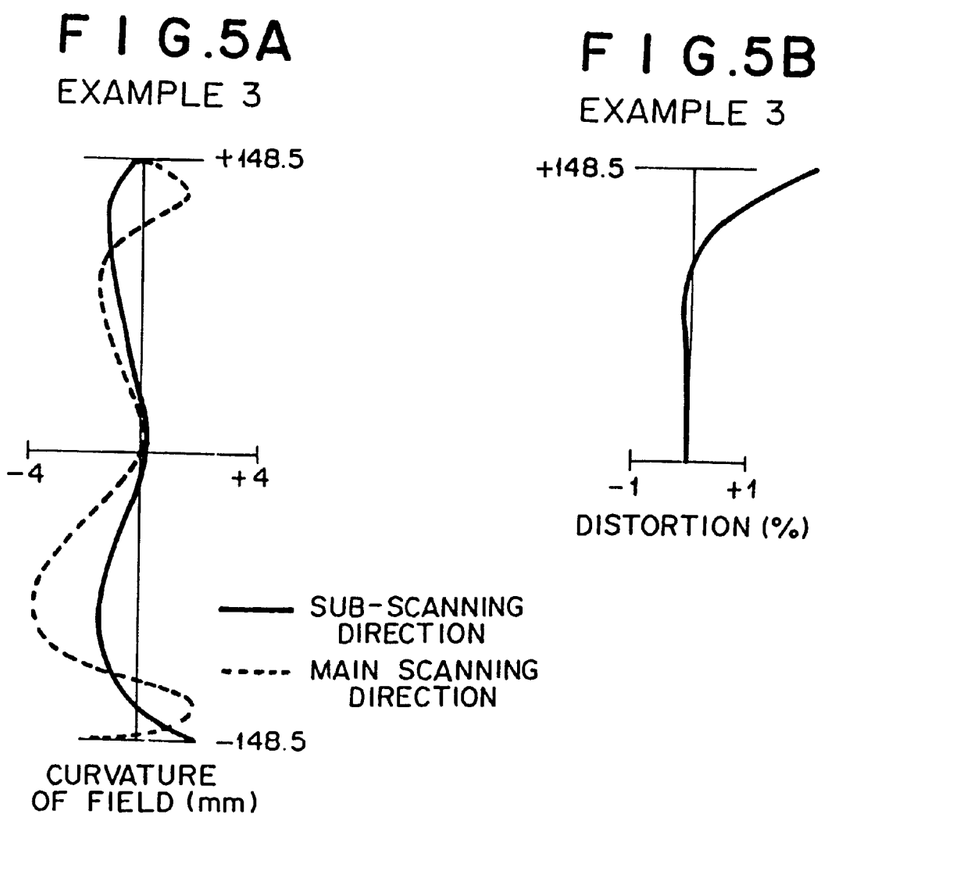
FIGS. 5A and 5B are aberration charts of the light-scanning optical system in accordance with Example 3.

FIGS. 3 to 5 show aberration charts (indicating curvature of field and distortion) of the light-scanning optical systems having a wobble-correcting function in accordance with Examples 1 to 3, respectively. As can be seen from FIGS. 3 to 5, each kind of aberration such as curvature of field in the sub-scanning direction is favorable.

Without being restricted to the above-mentioned Examples, the light-scanning optical systems having a wobble-correcting function and the light-scanning apparatus using the same in accordance with the present invention can be modified in various manners. For example, the radii of curvature $R_H$, $R_V$ and lens space (or lens thickness) D of each lens can be changed as appropriate.

Though the first lens 16 in the second imaging optical system 2 is a toric lens in which the surface on the second lens side has a cross-sectional form in the main scanning direction and a cross-sectional form in the sub-scanning direction different from each other, while having a positive power in both of the cross section in the main scanning direction and the cross section in the sub-scanning direction; the surface on the light-deflecting means side may not have a non-arc cross-sectional form in the main scanning direction.

Though the second lens 17 in the second imaging optical system 2 is a lens in which both surfaces are made of an aspheric surface having rotational symmetry, it may be a lens in which at lease one of the surfaces is not aspheric as long as both of them have a non-arc cross-sectional form in the main scanning direction.

Though the third lens 18 in the second imaging optical system 2 is a cylindrical lens, it may be a lens having substantially no power in the cross section in the main scanning direction and a positive power in the cross section in the main scanning direction. Further, it may be a concave cylindrical mirror having substantially no power in the cross section in the main scanning direction and a positive power in the cross section in the sub-scanning direction.

In the light-scanning optical system having a wobble-correcting function in accordance with the present invention, as explained in the foregoing, the second imaging optical system disposed between the light-deflecting/reflecting surface and the surface to be scanned has a three-element configuration comprising, successively from the light-deflecting means side, a first lens in which each surface has a cross-sectional form in the main scanning direction and a cross-sectional form in the sub-scanning direction different from each other, the cross section of the surface on the second lens side in the main scanning direction and sub-scanning direction having a positive power; a second lens in which each surface has a non-arc cross-sectional form in the main scanning direction; and a third lens having substantially no power in the cross section in the main scanning direction and a positive power in the cross section in the sub-scanning direction. As a consequence, the absolute value of imaging magnification $\beta$ between the light-deflecting/reflecting surface 15 and the surface 19 to be scanned with respect to the cross section in the sub-scanning direction can be made as small as 1 to 2.

Therefore, the curvature of field in the sub-scanning direction component can be lowered while securing the easiness and low cost in lens manufacture. Since the asymetry in curvature of field in the light-deflecting/reflecting surface becomes harder to enhance, the present invention is also applicable to light-scanning apparatus having a long scanning length exceeding the aborter side of an A3-size (Japanese Industrial Standard) sheet (297 mm).

TABLE 1

Example 1

| Surface | Radius of curvature in cross section in main scanning direction($R_H$) | Radius of curvature in cross section in sub-scanning direction($R_v$) | Spacing (D) | Refractive index (N < $\lambda$ = 780 nm>) |
|---|---|---|---|---|
| 1 | 500.000 (non-arc) | −13.270 | 15.00 | 1.51939 |
| 2 | −138.810 | −15.620 | 19.81 | |
| 3 | −78.948 (aspheric) | −78.948 | 7.50 | 1.51939 |
| 4 | −82.192 (aspheric) | −82.192 | 70.02 | |
| 5 | ∞ | 46.374 | 5.00 | 1.51118 |
| 6 | ∞ | ∞ | | |

Non-arc/aspheric coefficient (1st surface)

$1/R = 0.002$   $K = 0.9073084$
$A_4 = -1.917061 \times 10^{-7}$   $A_6 = -1.806773 \times 10^{-11}$
$A_8 = 0.0$   $A_{10} = 0.0$
(3$^{rd}$ surface)

$1/R = -0.0126666$   $K = 1.27037$
$A_4 = -2.143154 \times 10^{-6}$   $A_6 = 2.312442 \times 10^{-10}$
$A_8 = 5.244142 \times 10^{-14}$   $A_{10} = 0.0$
(4$^{th}$ surface)

$1/R = 0.0121666$   $K = 1.49352$
$A_4 = -1.706445 \times 10^{-6}$   $A_6 = 1.711549 \times 10^{-10}$
$A_8 = 1.626002 \times 10^{-14}$   $A_{10} = 0.0$
$D_o = 4.50$   $f = 220$   $\theta = 38.7°$   $\lambda = 780$ nm
$\beta_v = -1.187$   $f_{3v}/f_v = 1.393$

TABLE 2

Example 2

| Surface | Radius of curvature in cross section in main scanning direction($R_H$) | Radius of curvature in cross section in sub-scanning direction ($R_v$) | Spacing (D) | Refractive index (N < $\lambda$ = 780 nm>) |
|---|---|---|---|---|
| 1 | −34304.4 (non-arc) | −39.855 | 15.00 | 1.51939 |
| 2 | −107.615 | −22.792 | 13.46 | |
| 3 | −219.144 (aspheric) | −219.144 | 6.54 | 1.51939 |
| 4 | −246.111 (aspheric) | −246.111 | 75.02 | |
| 5 | ∞ | 53.584 | 5.00 | 1.51118 |
| 6 | ∞ | ∞ | | |

Non-arc/aspheric coefficient (1st surface)

$1/R = -2.91508 \times 10^{-5}$   $K = 1.009747$
$A_4 = 1.231291 \times 10^{-7}$   $A_6 = -2.115946 \times 10^{-11}$
$A_8 = 0.0$   $A_{10} = 0.0$
(3$^{rd}$ surface)

$1/R = -4.563210 \times 10^{-3}$   $K = 0.970557$
$A_4 = -1.507701 \times 10^{-6}$   $A_6 = -6.730711 \times 10^{-10}$
$A_8 = -1.898828 \times 10^{-15}$   $A_{10} = 3.113989 \times 10^{-18}$
(4th surface)

$1/R = -4.063207 \times 10^{-3}$   $K = 0.858804$
$A_4 = 1.372381 \times 10^{-6}$   $A_6 = -4.267528 \times 10^{-10}$
$A_8 = 1.057222 \times 10^{-14}$   $A_{10} = 2.733868 \times 10^{-19}$
$D_o = 50.00$   $f = 220$   $\theta = 38.7°$   $\lambda = 780$ nm
$\beta_v = -1.616$   $f_{3v}/f_v = 1.281$

TABLE 3

Example 3

| Surface | Radius of curvature in cross section in main scanning direction($R_H$) | Radius of curvature in cross section in sub-scanning direction ($R_v$) | Spacing (D) | Refractive index (N < $\lambda$ = 780 nm>) |
|---|---|---|---|---|
| 1 | −195.293 (non-arc) | −19.891 | 12.00 | 1.51939 |
| 2 | −71.252 | −15.053 | 13.72 | |
| 3 | 3041.24 (aspheric) | 3041.24 | 7.50 | 1.51939 |
| 4 | 1206.54 (aspheric) | 1206.54 | 76.50 | |
| 5 | ∞ | 48.992 | 5.00 | 1.51118 |
| 6 | ∞ | ∞ | | |

Non-arc/aspheric coefficient (1$^{st}$ surface)

$1/R = -5.120511 \times 10^{-3}$   $K = 0.851961$
$A_4 = 5.845518 \times 10^{-7}$   $A_6 = -1.778454 \times 10^{-10}$
$A_8 = 0.0$   $A_{10} = 0.0$
(3$^{rd}$ surface)

$1/R = 3.288132 \times 10^{-4}$   $K = 1.122794$
$A_4 = -5.191408 \times 10^{-6}$   $A_6 = -3.495865 \times 10^{-10}$
$A_8 = -4.647847 \times 10^{-14}$   $A_{10} = 0.0$
(4th surface)

$1/R = 8.288163 \times 10^{-4}$   $K = 0.881519$
$A_4 = -4.660096 \times 10^{-6}$   $A_6 = 2.865263 \times 10^{-10}$
$A_8 = -1.151213 \times 10^{-13}$   $A_{10} = 2.733868 \times 10^{-19}$ TABLE 3-continued Example 3

| $D_o = 36.00$ | $f = 220$ | $\theta = 38.7°$ | $\lambda = 780$ nm |
|---|---|---|---|
| $\beta_v = -1.883$ | $f_{3v}/f_v = 1.212$ | | |

What is claimed is:

1. A light-scanning optical system having a wobble-correcting function and comprising a first imaging optical system for linearly forming an image of a luminous flux from a light source onto a light-deflecting/reflecting surface of light-deflecting means or in the vicinity thereof, and a second imaging optical system for forming an image of the luminous flux deflected by said light-deflecting means onto a surface to be scanned, wherein said light-deflecting/reflecting surface and said surface to be scanned are substantially optically conjugate with each other with respect to a cross section in a sub-scanning direction;

said second imaging optical system comprising, successively from said light-deflecting means side, a first lens in which each surface has a cross-sectional form in a main scanning direction and a cross-sectional form in the sub-scanning direction different from each other, the cross section of the surface on the second lens side in the main scanning direction and sub-scanning direction having a positive power, a second lens in which each surface has a non-arc cross-sectional form in the main scanning direction, and a third lens having substantially no power in a cross section in the main scanning direction and a positive power in a cross section in the sub-scanning direction.

2. A light-scanning optical system according to claim 1, wherein the cross-sectional form in the main scanning direction of the surface of said first lens on the light-deflecting means side is non-arc.

3. A light-scanning optical system according to claim 1, wherein each surface of said second lens is an aspheric surface having rotational symmetry.

4. A light-scanning optical system according to claim 1, wherein said third lens is a cylindrical lens in which the cross-sectional form in the main scanning direction of each surface is a line approximately orthogonal to an optical axis.

5. A light-scanning optical system according to claim 1, wherein the cross-sectional form in the main scanning direction of the surface of said first lens on the light-deflecting means side is non-arc, each surface of said second lens is an aspheric surface having rotational symmetry, and said third lens is a cylindrical lens in which the cross-sectional form in the main scanning direction of each surface is a line approximately orthogonal to an optical axis.

6. A light-scanning optical system according to claim 1, wherein said first lens is a toric lens.

7. A light-scanning optical system according to claim 1, wherein said third lens is a concave cylindrical mirror.

8. A light-scanning optical system according to claim 1, wherein each of said first to third lenses is made of plastics.

9. A light-scanning optical system according to claim 1, wherein said light-scanning optical system satisfies the following conditional expression:

$$1.0 < f_{3F}/f_V < 1.6$$

where $f_V$ is the focal length of the second imaging optical system in the cross section in the sub-scanning direction; and $f_{3V}$ is the focal length of the third lens in the cross section in the sub-scanning direction.

10. A light-scanning apparatus using the light-scanning optical system according to claim 1.

11. A light-scanning optical system having a wobble-correcting function and comprising a first imaging optical system for linearly forming an image of a luminous flux from a light source onto a light-deflecting/reflecting surface of light-deflecting means or in the vicinity thereof, and a second imaging optical system for forming an image of the luminous flux deflected by said light-deflecting means onto a surface to be scanned, wherein said light-deflecting/reflecting surface and said surface to be scanned are substantially optically conjugate with each other with respect to a cross section in a sub-scanning direction;

said second imaging optical system comprising, successively from said light-deflecting means side, a first lens in which each surface has a cross-sectional form in a main scanning direction and a cross-sectional form in the sub-scanning direction different from each other, each of cross sections thereof in the main scanning direction and sub-scanning direction having a positive power, a second lens in which each surface has a non-arc cross-sectional form in the main scanning direction, and a third lens having substantially no power in a cross section in the main scanning direction and a positive power in a cross section in the sub-scanning direction.

12. A light-scanning optical system according to claim 11, wherein the cross-sectional form in the main scanning direction of the surface of said first lens on the light deflecting means side is non-arc.

13. A light-scanning optical system according to claim 11, wherein each surface of said second lens is an aspheric surface having rotational symmetry.

14. A light-scanning optical system according to claim 11, wherein said third lens is a cylindrical lens in which the cross-sectional form in the main scanning direction of each surface is a line orthogonal to an optical axis.

15. A light-scanning optical system according to claim 11, wherein the cross-sectional form in the main scanning direction of the surface of said first lens on the light-deflecting means side is non-arc, each surface of said second lens is an aspheric surface having rotational symmetry, and said third lens is a cylindrical lens in which the cross-sectional form in the main scanning direction of each surface is a line orthogonal to an optical axis.

16. A light-scanning optical system according to claim 11, wherein said first lens is a toric lens.

17. A light-scanning optical system according to claim 11, wherein said third lens is a concave cylindrical mirror.

18. A light-scanning optical system according to claim 11, wherein each of said first to third lenses is made of a resin.

19. A light-scanning optical system according to claim 11, wherein said light-scanning optical system satisfies the following conditional expression:

$$1.0 < f_{3V}/f_V < 1.6$$

where $f_V$ is the focal length of the second imaging optical system in the cross section in the sub-scanning direction; and $f_{3V}$ is the focal length of the third lens in the cross section in the sub-scanning direction.

20. A light-scanning apparatus using the light-scanning optical system according to claim 11.

* * * * *

UNITED STATES PATENT AND TRADEMARK OFFICE
CERTIFICATE OF CORRECTION

PATENT NO. : 6,178,030 B1
DATED : January 23, 2001
INVENTOR(S) : Hiromitsu Yamakawa It is certified that error appears in the above-identified patent and that said Letters Patent is hereby corrected as shown below:

Column 11,
Line 63, please delete "$1.0<f_{3F}/f_v<1.6$" and substitute therefore --- $1.0<f_{3V}/f_v<1.6$ ---.

Signed and Sealed this

Fourth Day of September, 2001

*Attest:*

*Nicholas P. Godici*

*Attesting Officer*

NICHOLAS P. GODICI
*Acting Director of the United States Patent and Trademark Office*